(12) United States Patent
Zeng

(10) Patent No.: US 11,506,904 B1
(45) Date of Patent: Nov. 22, 2022

(54) PRESENTATION CONTENT UPDATE METHOD, HEAD-MOUNTED DISPLAY, AND COMPUTER-READABLE MEDIUM

(71) Applicant: HANGZHOU LINGBAN TECHNOLOGY CO. LTD., Hangzhou (CN)

(72) Inventor: Tao Zeng, Hangzhou (CN)

(73) Assignee: HANGZHOU LINGBAN TECHNOLOGY CO. LTD., Hangzhou (CN)

( * ) Notice: Subject to any disclaimer, the term of this patent is extended or adjusted under 35 U.S.C. 154(b) by 0 days.

(21) Appl. No.: 17/846,931

(22) Filed: Jun. 22, 2022

(30) Foreign Application Priority Data

Jun. 24, 2021 (CN) .......................... 202110705347.6

(51) Int. Cl.
*G02B 27/01* (2006.01)
*G06F 3/01* (2006.01)
*G06F 3/04815* (2022.01)

(52) U.S. Cl.
CPC .......... *G02B 27/0172* (2013.01); *G06F 3/011* (2013.01); *G06F 3/04815* (2013.01); *G02B 2027/0178* (2013.01)

(58) Field of Classification Search
USPC ............................................................. 345/8
See application file for complete search history.

(56) References Cited

U.S. PATENT DOCUMENTS 9,658,692 B1* 5/2017 Keyes ................ G01R 33/0029
2015/0170422 A1* 6/2015 Aoyama ............... G06T 15/005
345/8
(Continued)

FOREIGN PATENT DOCUMENTS

| CN | 107533360 A | 1/2018 |
| CN | 108537071 A | 9/2018 |

(Continued)

OTHER PUBLICATIONS

CN 202110705347.6—Search Report, dated Jan. 6, 2022, 2 pages. (partial English translation).
(Continued)

*Primary Examiner* — Chineyere D Wills-Burns
(74) *Attorney, Agent, or Firm* — Getech Law LLC; Jun Ye

(57) ABSTRACT

Embodiments of the present disclosure disclose a presentation content update method, a head-mounted display device and a computer-readable medium. One specific embodiment of the method includes: determining three-axis attitude angles of a target device and three-axis attitude angles of a head-mounted display device based on first sensor data with respect to the target device sent by a first sensor and second sensor data with respect to the head-mounted display device sent by a second sensor; determining whether the three-axis attitude angles of the target device and the three-axis attitude angles of the head-mounted display device meet an attitude angle deviation detection condition; and updating presentation content on a display screen of the head-mounted display device in response to determining that the three-axis attitude angles of the target device and the three-axis attitude angles of the head-mounted display device meet the attitude angle deviation detection condition.

10 Claims, 5 Drawing Sheets

(56) References Cited

U.S. PATENT DOCUMENTS

| | | | | |
|---|---|---|---|---|
| 2017/0357334 A1* | 12/2017 | Balan | ................ | G06F 3/0346 |
| 2018/0181196 A1* | 6/2018 | Lee | ..................... | G06T 7/70 |
| 2019/0219824 A1* | 7/2019 | Shinohara | ............ | G06F 3/012 |
| 2019/0324634 A1* | 10/2019 | Gao | ................... | G06T 19/006 |
| 2019/0392558 A1* | 12/2019 | Pouliquen | ............ | G06T 3/60 |
| 2021/0312160 A1* | 10/2021 | Shin | ................... | G02B 27/01 |
| 2022/0011857 A1* | 1/2022 | Akiyama | ............ | G06T 19/00 |

FOREIGN PATENT DOCUMENTS

| | | | |
|---|---|---|---|
| CN | 112912824 | A | 6/2021 |
| CN | 113407084 | B | 5/2022 |
| JP | 2017054201 | A | 3/2017 |
| TW | 201312384 | A | 3/2013 |

OTHER PUBLICATIONS

CN 202110705347.6—Supplemental Search, dated Feb. 28, 2022, 1 page. (partial English translation).
CN 202110705347.6—First Office Action, dated Jan. 6, 2022, 8 pages. (with English translation).
CN 202110705347.6—Notification to Grant, dated Mar. 16, 2022, 3 pages. (with English translation).

* cited by examiner

PRESENTATION CONTENT UPDATE METHOD, HEAD-MOUNTED DISPLAY, AND COMPUTER-READABLE MEDIUM

TECHNICAL FIELD

Embodiments of the present disclosure relate to the technical field of computers, and in particular relate to a presentation content update method, a head-mounted display device and a computer-readable medium.

BACKGROUND

Head-mounted display devices, such as augmented reality (AR) glasses or mixed reality (MR) glasses, provide users with a way to view a virtual scene in a real scene. Meanwhile, the head-mounted display device may further be in communication connection with target devices such as a mobile phone. At present, when a user wearing a head-mounted display device has the requirement of directly browsing or operating a target device such as a mobile phone, a usual interaction mode is as follows: The user needs to take off the head-mounted display device to browse or operate the target device such as the mobile phone, and then when needing to view an interface of the head-mounted display device, the user wears the head-mounted display device again.

However, when interaction is performed in the above manner, the following technical problems often exist: If the user repeatedly takes off or wears the head-mounted display device, operation steps are relatively tedious, and user experience is relatively poor. If the user directly browses or operates the target device such as the mobile phone through the head-mounted display device, presentation content in the head-mounted display device may block an interface of the mobile phone.

SUMMARY

Summary of the present disclosure is provided to introduce concepts in a simplified form that will be described in detail below in description of embodiments. Summary of the present disclosure is not intended to identify key features or essential features of the claimed technical solutions, and is not intended to be used to limit the scopes of the claimed technical solutions either.

Some embodiments of the present disclosure disclose a presentation content update method, a head-mounted display device and a computer-readable medium, to solve the technical problems mentioned in Background above.

In a first aspect, some embodiments of the present disclosure provide a presentation content update method, including: determining three-axis attitude angles of a target device and three-axis attitude angles of a head-mounted display device based on first sensor data with respect to the target device sent by a first sensor and second sensor data with respect to the head-mounted display device sent by a second sensor; determining whether the three-axis attitude angles of the target device and the three-axis attitude angles of the head-mounted display device meet an attitude angle deviation detection condition; and updating presentation content on a display screen of the head-mounted display device in response to determining that the three-axis attitude angles of the target device and the three-axis attitude angles of the head-mounted display device meet the attitude angle deviation detection condition.

In a second aspect, some embodiments of the present disclosure provide a head-mounted display device, including one or more processors; a storage apparatus, on which one or more programs are stored; a display screen, configured to display presentation content; and a second sensor, configured to send second sensor data with respect to the head-mounted display device, where the one or more programs, when executed by the one or more processors, cause the one or more processors to implement the method described by any implementation of the above-mentioned first aspect.

In a third aspect, some embodiments of the present disclosure provide a computer-readable medium on which a computer program is stored, where the program, when executed by a processor, implements the method described by any implementation of the above-mentioned first aspect.

The above-mentioned embodiments of the present disclosure have the following beneficial effects: According to the presentation content update method of some embodiments of the present disclosure, when a user wearing the head-mounted display device has the requirement of directly browsing or operating the target device such as a mobile phone, the user can browse or operate the target device such as the mobile phone without blocking through the head-mounted display device without taking off the head-mounted display device. Specifically, reasons for complicated operation steps, poor user experience, or blocking when browsing and operating the target device such as the mobile phone are that it is impossible to judge whether the user wearing the head-mounted display device has the requirement of browsing or operating the target device such as the mobile phone, so that the presentation content in the head-mounted display device cannot be actively removed. Based on this, the presentation content update method of some embodiments of the present disclosure determines whether the user wearing the head-mounted display device has the requirement of browsing or operating the target device such as the mobile phone according to included angles between the three-axis attitude angles of the target device and the three-axis attitude angles of the head-mounted display device. When the three-axis attitude angles of the target device and the three-axis attitude angles of the head-mounted display device meet the attitude angle deviation detection condition, it may indicate that the user has the requirement of browsing or operating the target device such as the mobile phone. In this case, the presentation content on the display screen of the head-mounted display device is updated, so that the user can directly browse or operate the target device such as the mobile phone without blocking without taking off the head-mounted display device, which simplifies operation processes, and improves user experience.

BRIEF DESCRIPTION OF DRAWINGS

The above and other features, advantages and aspects of various embodiments of the present disclosure will become more apparent in conjunction with the accompanying drawings and with reference to the following description of embodiments. Throughout the drawings, the same or similar reference signs refer to the same or similar elements. It should be understood that the drawings are illustrative and that components and elements are not necessarily drawn to scale.

DESCRIPTION OF EMBODIMENTS

Figure 1:
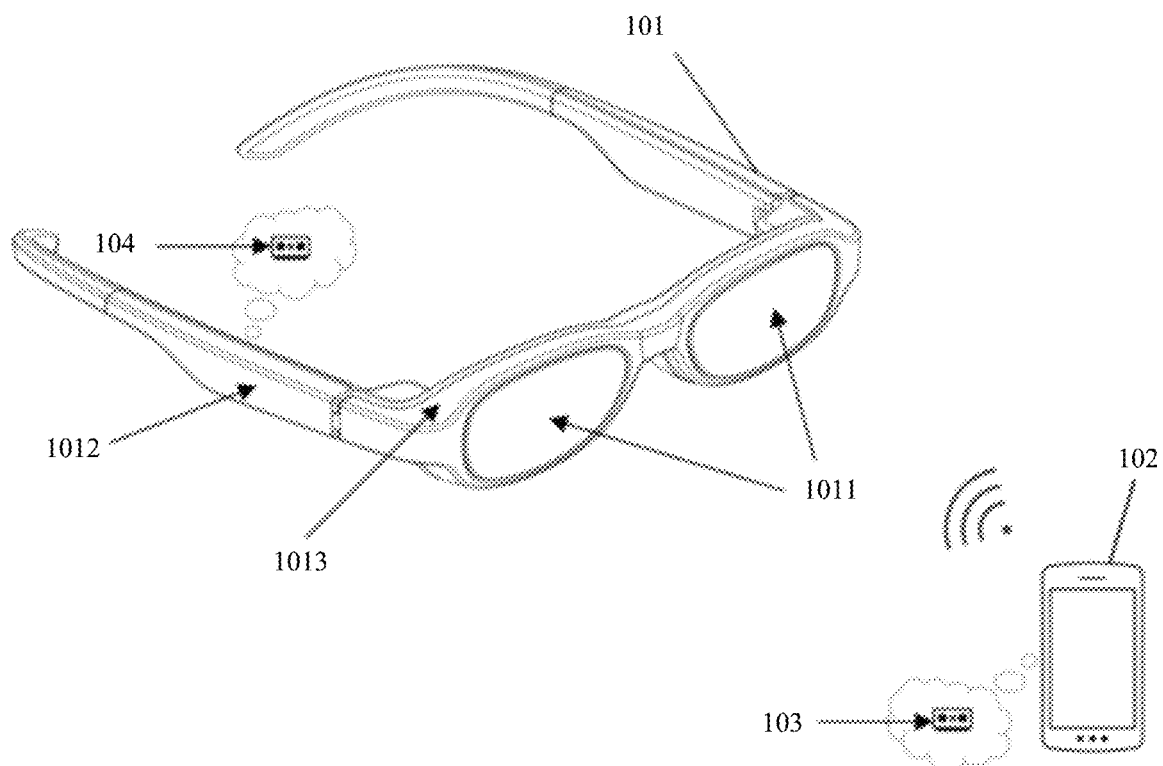
FIG. 1 is an architectural diagram of an exemplary system in which some embodiments of the present disclosure can be applied.

Embodiments of the present disclosure will be described in more detail below with reference to the accompanying drawings. Although some embodiments of the present disclosure are shown in the drawings, it should be understood that the present disclosure can be embodied in various forms and should not be construed as limited to the embodiments set forth herein. Rather, these embodiments are provided for a more thorough and complete understanding of the present disclosure. It should be understood that the drawings and embodiments of the present disclosure are for exemplary purposes only and are not intended to limit the scope of protection of the present disclosure.

It should also be noted that, for ease of description, only parts relevant to the relevant invention are shown in the drawings. Embodiments and features in the embodiments of the present disclosure can be combined with each other in case of conflict.

It should be noted that the concepts of "first", "second", and the like mentioned in the present disclosure are only used to distinguish between different apparatuses, modules or units, and are not used to limit the order or interdependence of functions performed by these apparatuses, modules or units.

It should be noted that the expression of "one" or "a plurality" mentioned in the present disclosure is illustrative rather than restrictive, and those skilled in the art should understand that unless otherwise clearly specified in the context, it should be understood as "one or more".

The names of messages or information exchanged between a plurality of apparatuses in embodiments of the present disclosure are for illustrative purposes only and are not intended to limit the scope of such messages or information.

The present disclosure will now be described in detail with reference to the drawings and in conjunction with embodiments.

FIG. 1 is an architectural diagram of an exemplary system in which some embodiments of the present disclosure can be applied.

As shown in FIG. 1, the architecture of the exemplary system 100 may include a head-mounted display device 101, a target device 102, a first sensor 103 and a second sensor 104.

The head-mounted display device 101 may include at least one display screen 1011. The display screen 1011 may be used to display presentation content. In addition, the head-mounted display device 101 further includes a spectacle bracket 1012 and a spectacle frame 1013. In some embodiments, a processing unit, a memory and a battery of the head-mounted display device 101 may be placed in the spectacle bracket 1012. In some optional implementations of some embodiments, one or more of the processing unit, the memory and the battery may be integrated into another independent accessory (not shown), and are connected to the spectacle bracket 1012 via a data line.

The target device 102 may communicate with the head-mounted display device 101 in a wireless connection manner or a wired connection manner.

The first sensor 103 may be disposed in the target device 102. In some embodiments, the first sensor 103 and the head-mounted display device 101 may communicate with each other in a wireless connection manner or a wired connection manner.

The second sensor 104 may be disposed in the head-mounted display device 101. In some embodiments, the second sensor 104 and the head-mounted display device 101 may communicate with each other in a wireless connection manner or a wired connection manner. The second sensor 104 may be disposed in the spectacle bracket 1012 of the head-mounted display device 101.

It should be understood that the numbers of the head-mounted display device, the target device, the first sensor and the second sensor in FIG. 1 are merely illustrative. There may be any number of head-mounted display devices, target device, first sensors and second sensors depending on implementation needs.

Figure 2:
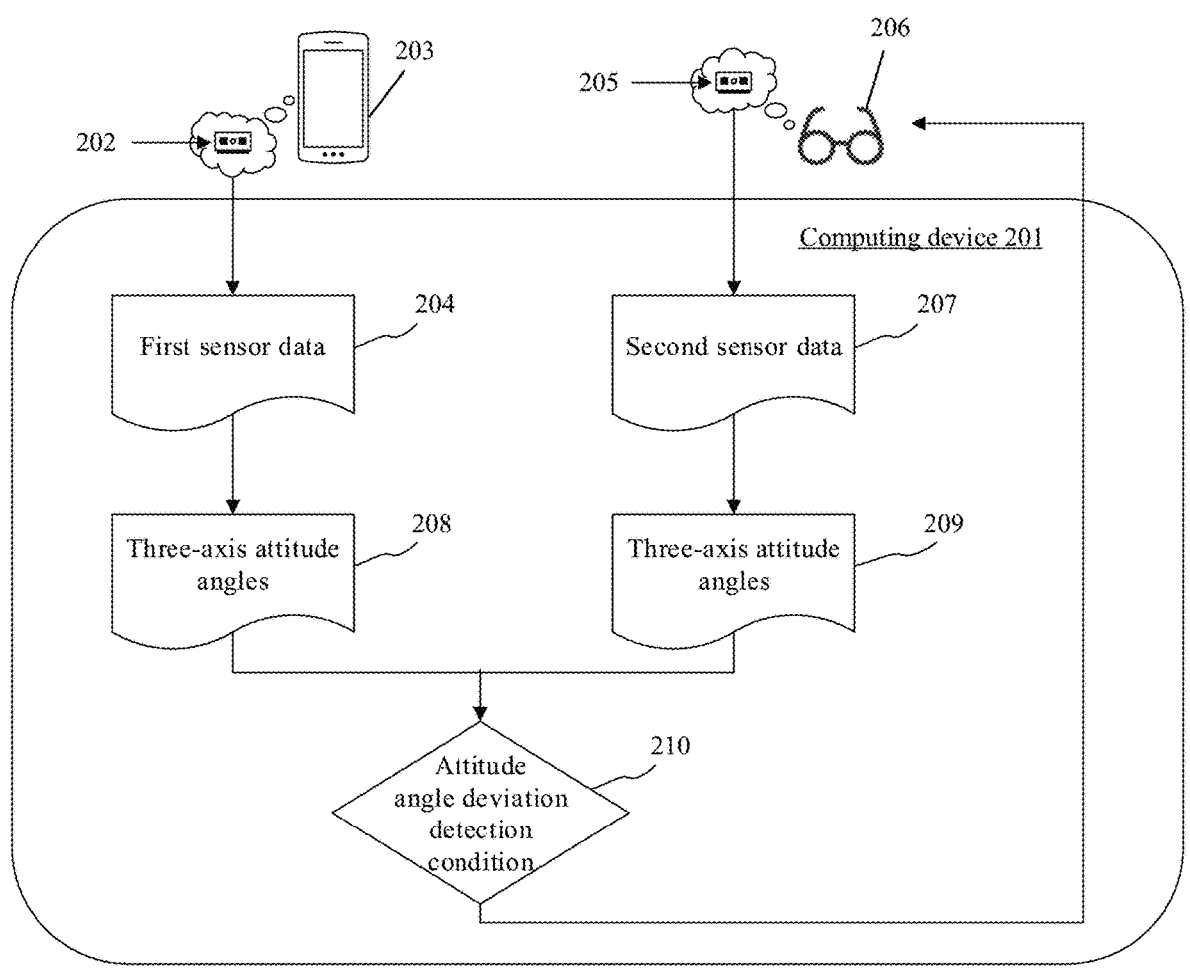
FIG. 2 is a schematic diagram of an application scene of a presentation content update method according to some embodiments of the present disclosure.

FIG. 2 is a schematic diagram of an application scene of a presentation content update method according to some embodiments of the present disclosure.

In the application scene of FIG. 2, firstly, a computing device 201 may determine three-axis attitude angles 208 of a target device 203 and three-axis attitude angles 209 of a head-mounted display device 206 based on first sensor data 204 with respect to the target device 203 sent by a first sensor 202 and second sensor data 207 with respect to the head-mounted display device 206 sent by a second sensor 205. Then, the computing device 201 may determine whether the three-axis attitude angles 208 of the target device 203 and the three-axis attitude angles 209 of the head-mounted display device 206 meet an attitude angle deviation detection condition 210. Finally, in response to determining that the three-axis attitude angles 208 of the target device 203 and the three-axis attitude angles 209 of the head-mounted display device 206 meet the attitude angle deviation detection condition 210, the computing device 201 may update presentation content on a display screen of the head-mounted display device 206.

It should be noted that the computing device 201 may be hardware or software. When being hardware, the computing device may be realized as a distributed cluster composed of a plurality of servers or terminal devices, or may be realized as a single server or a single terminal device. When embodied as software, the computing device may be installed in the hardware devices, or in the target device and the head-mounted display device. It may be implemented, for example, as a plurality of software or software modules for providing distributed services, or as a single software or software module. No specific limitation is made herein.

It should be understood that the number of the computing device in FIG. 2 is merely illustrative. There may be any number of computing devices depending on implementation needs.

Figure 3:
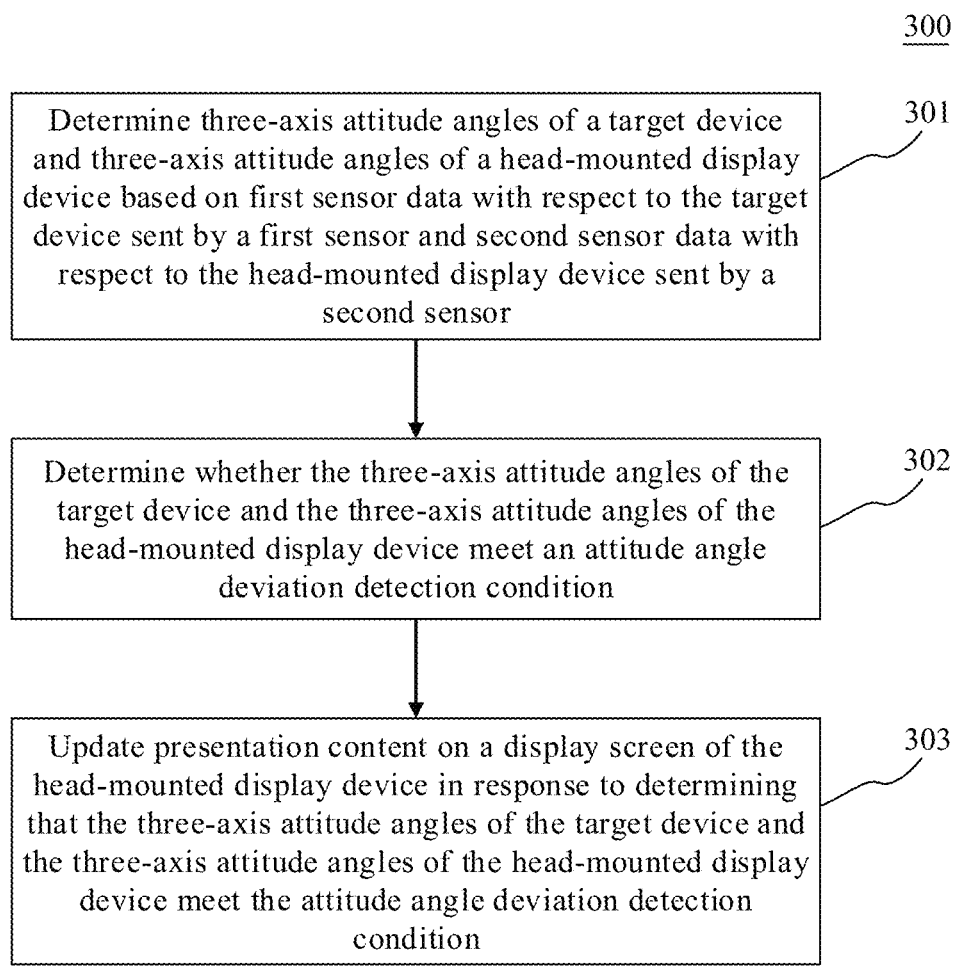
FIG. 3 is a flowchart of a presentation content update method according to some embodiments of the present disclosure.

With continued reference to FIG. 3, a flow 300 of a presentation content update method according to some embodiments of the present disclosure is shown. The flow 300 of the presentation content update method includes the following steps:

Step 301: Determine three-axis attitude angles of a target device and three-axis attitude angles of a head-mounted display device based on first sensor data with respect to the target device sent by a first sensor and second sensor data with respect to the head-mounted display device sent by a second sensor.

In some embodiments, an execution body (e.g., the computing device 201 shown in FIG. 2) of the presentation content update method may determine the three-axis attitude angles of the target device and the three-axis attitude angles of the head-mounted display device based on the first sensor data with respect to the target device sent by the first sensor and the second sensor data with respect to the head-mounted display device sent by the second sensor, where the first sensor may be disposed in the target device. The target device may be a device connected to the head-mounted display device, e.g., a mobile phone, in a wired connection manner or a wireless connection manner. The second sensor may be disposed in the head-mounted display device. The first sensor data and the second sensor data may respectively include the current three-axis attitude angles of the target device and the current three-axis attitude angles of the head-mounted display device. The first sensor data may be directly determined as the three-axis attitude angles of the target device, and the second sensor data may be directly determined as the three-axis attitude angles of the head-mounted display device. The first sensor and the second sensor may be sensors used to measure angle changes. It should be noted that the first sensor and the second sensor may include, but are not limited to, gyroscopes and other angle measuring sensors currently known or developed in the future.

The three-axis attitude angles of the target device may represent included angles between the target device and three coordinate axes in a first three-dimensional right-angle reference coordinate system. The three-axis attitude angles of the head-mounted display device may represent included angles between the head-mounted display device and three coordinate axes in a second three-dimensional right-angle reference coordinate system. The first three-dimensional right-angle reference coordinate system may be a coordinate system taking the center of mass of the target device as an origin, taking an axis which passes through the origin and is perpendicular to a horizontal plane as a longitudinal axis, taking an axis which passes through the due north direction of the origin as a vertical axis, and taking an axis which passes through the origin and is simultaneously perpendicular to the longitudinal axis and the longitudinal axis as a transverse axis. The second three-dimensional right-angle reference coordinate system may be a coordinate system taking the center of mass of the head-mounted display device as an origin, taking an axis which passes through the origin and is perpendicular to a horizontal plane as a longitudinal axis, taking an axis which passes through the due north direction of the origin as a vertical axis, and taking an axis which passes through the origin and is simultaneously perpendicular to the longitudinal axis and the longitudinal axis as a transverse axis. The positive directions of the longitudinal axis, the vertical axis and the transverse axis of the first three-dimensional right-angle reference coordinate system are respectively consistent with the positive directions of the longitudinal axis, the vertical axis and the horizontal axis of the second three-dimensional right-angle reference coordinate system.

As an example, the three-axis attitude angles included in the first sensor data may be: (longitudinal axis: 10°, vertical axis: 20°, transverse axis: 30°). As an example, the three-axis attitude angles included in the second sensor data may be: (longitudinal axis: 8°, vertical axis: 19°, transverse axis: 33°). The three-axis attitude angles of the target device may be: (longitudinal axis: 10°, vertical axis: 20°, transverse axis: 30°). The three-axis attitude angles of the head-mounted display device may be: (longitudinal axis: 8°, vertical axis: 19°, transverse axis: 33°.

In some optional implementations of some embodiments, the first sensor data and the second sensor data may include three-axis angular acceleration data. The execution body determining three-axis attitude angles of a target device and three-axis attitude angles of the head-mounted display device based on first sensor data with respect to the target device sent by a first sensor and second sensor data with respect to the head-mounted display device sent by a second sensor may include the following steps:

Step 1: Filter and integrate three-axis angular acceleration data included in the received first sensor data to obtain the three-axis attitude angles of the target device, where the three-axis angular acceleration data included in the first sensor data may be filtered by using a filtering algorithm. The filtering algorithm may include, but is not limited to, a clipping filtering algorithm, a Kalman filtering algorithm, or a median filtering algorithm, etc. The filtered three-axis angular acceleration data is respectively integrated to obtain the three-axis attitude angles of the target device.

Step 2: Filter and integrate three-axis angular acceleration data included in the received second sensor data to obtain the three-axis attitude angles of the head-mounted display device.

Step 302: Determine whether the three-axis attitude angles of the target device and the three-axis attitude angles of the head-mounted display device meet an attitude angle deviation detection condition.

In some embodiments, the execution body may determine whether the three-axis attitude angles of the target device and the three-axis attitude angles of the head-mounted display device meet the attitude angle deviation detection condition, where the attitude angle deviation detection condition may be that all differences between the three-axis attitude angles of the target device and the three-axis attitude angles of the head-mounted display device are within a preset difference interval. In practice, the preset difference interval may be set according to actual applications, which is not limited here.

As an example, the preset difference interval may be [−5°, 5°]. The three-axis attitude angles of the target device may be (longitudinal axis: 10°, vertical axis: 20°, transverse axis: 30°). The three-axis attitude angles of the head-mounted display device may be (longitudinal axis: 8°, vertical axis: 19°, transverse axis: 33°). The differences between the three-axis attitude angles of the target device and the three-axis attitude angles of the head-mounted display device respectively are (longitudinal axis: 2°, vertical axis: 1°, transverse axis: −3°), all of which are within the preset difference interval [−5°, 5°].

Thus, after determining that the three-axis attitude angles of the target device and the three-axis attitude angles of the head-mounted display device meet the attitude angle deviation detection condition, it can be determined that the target device and the head-mounted display device are in an opposite state. In this case, it can be determined that the user wearing the head-mounted display device has the requirement of directly viewing the content of the target device.

Step 303: Update presentation content on the display screen of the head-mounted display device in response to determining that the three-axis attitude angles of the target device and the three-axis attitude angles of the head-mounted display device meet the attitude angle deviation detection condition.

In some embodiments, in response to determining that the three-axis attitude angles of the target device and the three-axis attitude angles of the head-mounted display device meet the attitude angle deviation detection condition, the execution body shrinks the presentation content on the display screen of the head-mounted display device and then displays the same in a specific area of the display screen, where the specific area may be the upper left corner or the lower right corner of the display screen.

In some optional implementations of some embodiments, the execution body may remove the presentation content on the display screen of the head-mounted display device, where the presentation content may be directly removed in the display screen. The presentation content may alternatively be removed with a preset motion. The preset motion may be a preset animation style when the presentation content is removed. For example, the preset motion may be a motion that causes the presentation content to fly out. The preset motion may alternatively cause the presentation content to be gradually shrink until disappearing.

Thus, after it is determined that the target device and the head-mounted display device are in the opposite state, the presentation content on the display screen of the head-mounted display device may be shrunk and then displayed, or removed. Therefore, the blocked content in the head-mounted display device is actively shrunk or removed, so that the user wearing the head-mounted display device can use the target device or browse the content of the target device without blocking.

The above-mentioned embodiments of the present disclosure have the following beneficial effects: According to the presentation content update method of some embodiments of the present disclosure, when a user wearing the head-mounted display device has the requirement of directly browsing or operating the target device such as a mobile phone, the user can browse or operate the target device such as the mobile phone without blocking through the head-mounted display device without taking off the head-mounted display device. Specifically, reasons for complicated operation steps, poor user experience, or blocking when browsing and operating the target device such as the mobile phone are that it is impossible to judge whether the user wearing the head-mounted display device has the requirement of browsing or operating the target device such as the mobile phone, so that the presentation content in the head-mounted display device cannot be actively removed. Based on this, the presentation content update method of some embodiments of the present disclosure determines whether the user wearing the head-mounted display device has the requirement of browsing or operating the target device such as the mobile phone according to included angles between the three-axis attitude angles of the target device and the three-axis attitude angles of the head-mounted display device. When the three-axis attitude angles of the target device and the three-axis attitude angles of the head-mounted display device meet the attitude angle deviation detection condition, it may indicate whether the user has the requirement of browsing or operating the target device such as the mobile phone. In this case, the presentation content on the display screen of the head-mounted display device is updated, so that the user can directly browse or operate the target device such as the mobile phone without blocking without taking off the head-mounted display device, which simplifies operation processes, and improves user experience.

Figure 4:
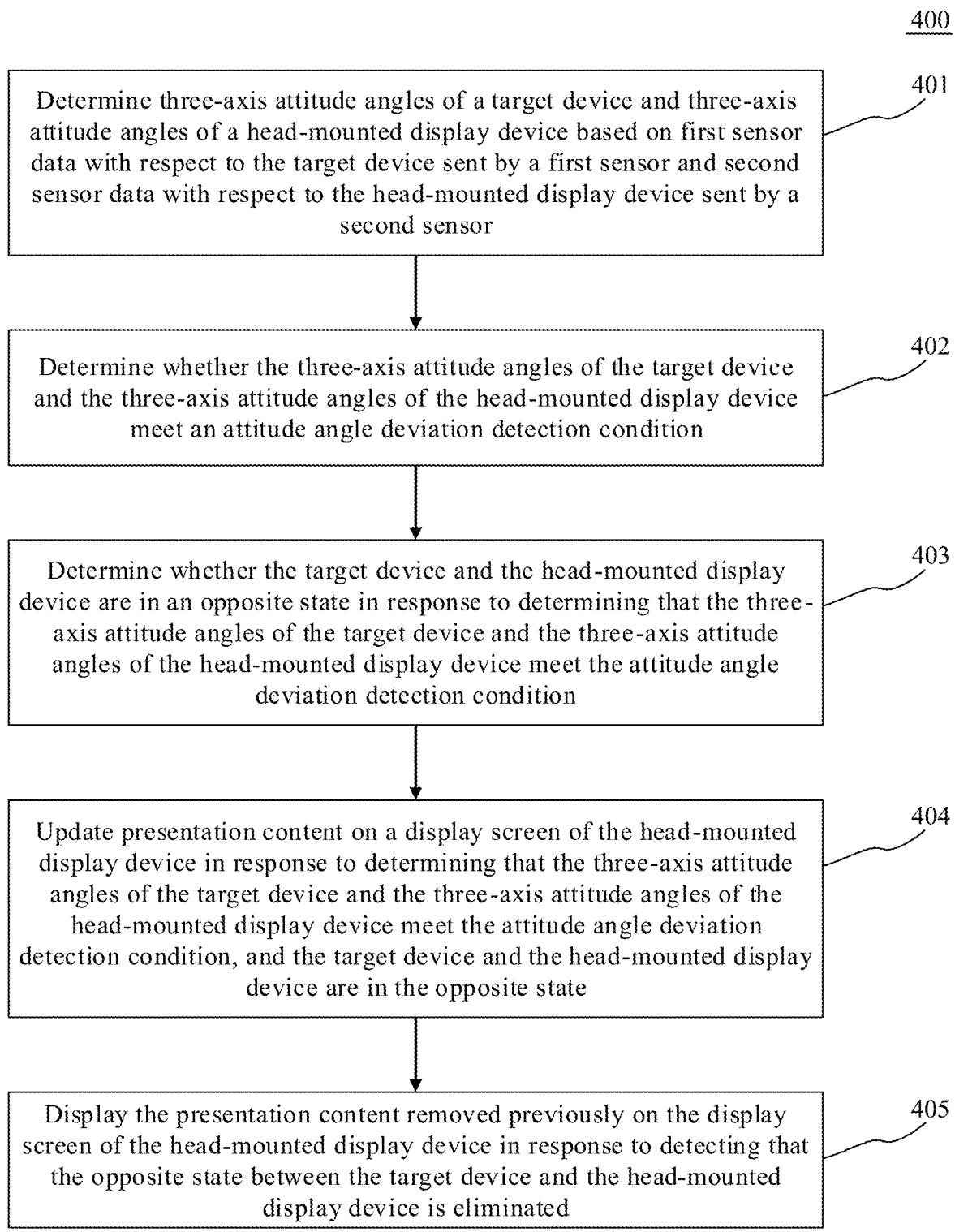
FIG. 4 is a flowchart of a presentation content update method according to some other embodiments of the present disclosure.

Further referring to FIG. 4, a flow 400 of a presentation content update method according to some other embodiments is shown. The flow 400 of the presentation content update method includes the following steps:

Step 401: Determine three-axis attitude angles of a target device and three-axis attitude angles of a head-mounted display device based on first sensor data with respect to the target device sent by a first sensor and second sensor data with respect to the head-mounted display device sent by a second sensor.

Step 402: Determine whether the three-axis attitude angles of the target device and the three-axis attitude angles of the head-mounted display device meet an attitude angle deviation detection condition.

In some embodiments, for the specific implementation and resulting technical effects of steps 401-402, refer to steps 301-302 in those embodiments corresponding to FIG. 3, which are not repeated here.

Step 403: Determine whether the target device and the head-mounted display device are in an opposite state in response to determining that the three-axis attitude angles of the target device and the three-axis attitude angles of the head-mounted display device meet the attitude angle deviation detection condition.

In some embodiments, in response to determining that the three-axis attitude angles of the target device and the three-axis attitude angles of the head-mounted display device meet the attitude angle deviation detection condition, the execution body (e.g., the computing device 201 shown in FIG. 2) of the presentation content update method determining whether the target device and the head-mounted display device are in the opposite state may include the following steps:

Step 1: In response to determining that infrared sensors are disposed in both the target device and the head-mounted display device, control the infrared sensor in the target device to emit an infrared signal.

Step 2: In response to determining that the infrared sensor in the head-mounted display device receives the infrared signal, determine that the target device and the head-mounted display device are in the opposite state.

Step 3: In response to determining that the infrared sensor in the head-mounted display device does not receive the infrared signal, determine that the target device and the head-mounted display device are not in the opposite state.

In some optional implementations of some embodiments, the execution body determining whether the target device and the head-mounted display device are in the opposite state may include the following steps:

Step 1: Control a front camera in the target device to shoot an image, to obtain a first target image.

Step 2: Determine whether the first target image includes a target image area, where the target image area includes an image of a face wearing the head-mounted display device. The first target image may be input into a target detection model to determine whether the first target image includes the target image area, where the target detection model may include, but is not limited to, a regional convolutional neural network (R-CNN) model, a fast regional convolutional neural network (Fast R-CNN) model, a spatial pyramid pooling net (SPPNet) model, etc.

Step 3: In response to determining that the first target image includes the target image area, determine an angle between a center point of the target image area and a location of the front camera in the target device when the first target image is shot. A target positioning model may be used to determine the angle, where the target positioning model may include, but is not limited to, a convolutional neural network (CNN), a recurrent neural network (RNN), etc.

Figure 5:
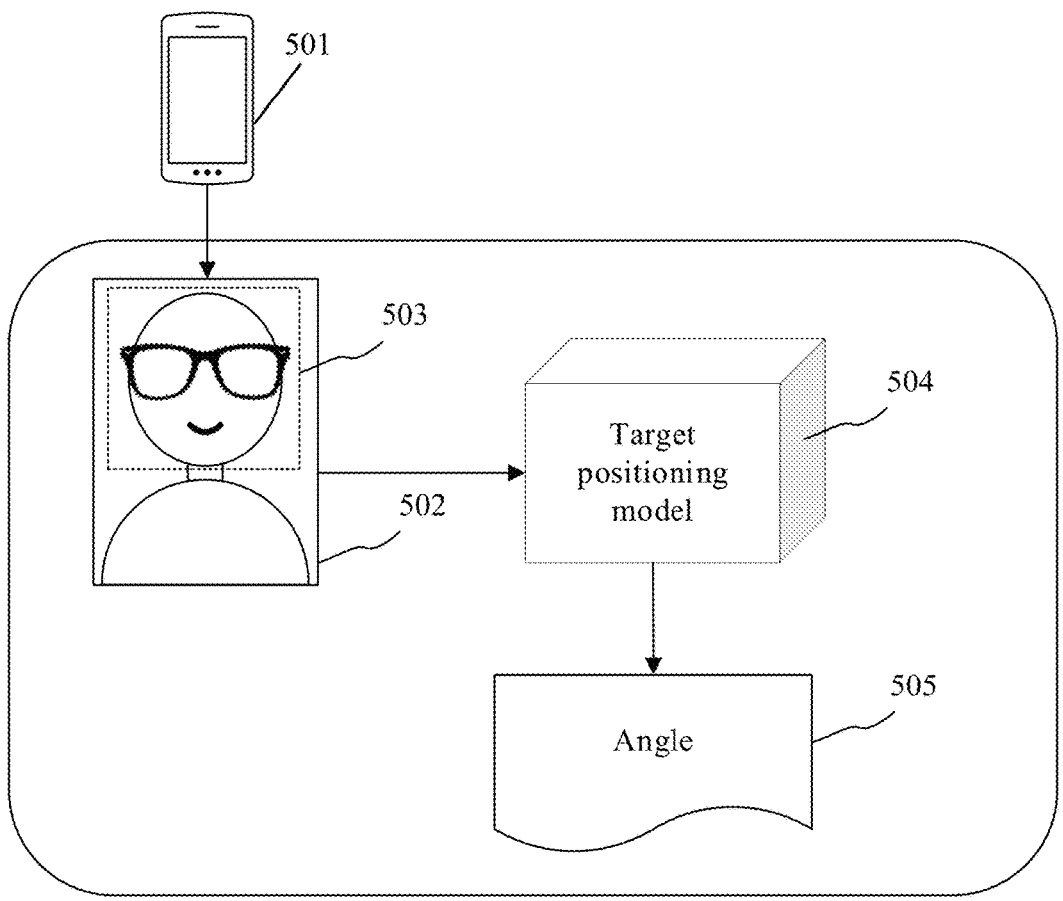
FIG. 5 is a schematic diagram of determining whether a target device and a head-mounted display device are in an opposite state in a presentation content update method according to some embodiments of the present disclosure.

As an example, referring to FIG. 5, firstly, a front camera in a target device 501 may be controlled to shoot an image, to obtain a first target image 502. Then, it can be determined whether the first target image 502 includes a target image area 503, where the target image area 503 includes an image of a face wearing the head-mounted display device. Finally, in response to determining that the first target image 502 includes the target image area 503, the first target image 502 may be input into a target positioning model 504, to obtain an angle 505 between a center point of the target image area 503 and a location of the front camera in the target device 501 when the first target image 502 is shot.

In some optional implementations of some embodiments, the execution body may further determine whether the target device and the head-mounted display device are in the opposite state through the following steps:

Step 1: Control the target device to display at least one graphic mark on a page currently displayed by the target device, where the graphic mark may include, but is not limited to, a two-dimensional code, a special polygon, etc.

Step 2: Control a front camera in the head-mounted display device to shoot an image, to obtain a second target image.

Step 3: In response to determining that the second target image includes the at least one graphic mark, determine an angle between the target device and a location of the front camera in the head-mounted display device when the second target image is shot according to the at least one graphic mark included in the second target image. The second target image may be input into the target positioning model to obtain the angle.

Optionally, before controlling the target device to display the at least one graphic mark on the page currently displayed by the target device, the target device may be controlled to turn on a screen in response to determining that the target device is in an off-screen state.

Optionally, in response to determining that the angle is within a preset angle range, the execution body may determine that the target device and the head-mounted display device are in the opposite state. In practice, the preset angle range may be set according to actual applications, which is not limited here. As an example, the preset angle range may be [0°, 40°].

Thus, it can be further determined whether the target device and the head-mounted display device are in the opposite state by judging the angle, avoiding misjudgment caused by determining whether the target device and the head-mounted display device are in the opposite state only based on attitude angle deviations between the three-axis attitude angles of the target device and the three-axis attitude angles of the head-mounted display device. Therefore, a misjudgment rate is reduced, and user experience is further improved.

Step 404: Update the presentation content on the display screen of the head-mounted display device in response to determining that the three-axis attitude angles of the target device and the three-axis attitude angles of the head-mounted display device meet the attitude angle deviation detection condition, and the target device and the head-mounted display device are in the opposite state.

In some embodiments, for the specific implementation and resulting technical effects of updating the presentation content on the display screen of the head-mounted display device in step 404, refer to step 303 in those embodiments corresponding to FIG. 3, which are not repeated here.

Step 405: In response to detecting that the opposite state between the target device and the head-mounted display device is eliminated, display the presentation content removed previously on the display screen of the head-mounted display device.

In some embodiments, in response to detecting that the opposite state between the target device and the head-mounted display device is eliminated, the presentation content removed previously is displayed on the display screen of the head-mounted display device, where elimination of the opposite state may refer to that the three-axis attitude angles of the target device and the three-axis attitude angles of the head-mounted display device are changed from meeting the attitude angle deviation detection condition to not meeting the attitude angle deviation detection condition.

Thus, after the opposite state between the target device and the head-mounted display device is eliminated, it can be determined that the user wearing the head-mounted display device does not have the requirement of viewing the content of the target device directly through the head-mounted display device. Then, the presentation content removed previously is displayed on the display screen of the head-mounted display device, ensuring the continuity of the content viewed by the user on the display screen of the head-mounted display device, and further improving the user experience.

It can be seen from FIG. 4 that, compared with the description of some embodiments corresponding to FIG. 3, the flow 400 of the presentation content update method in some embodiments corresponding to FIG. 4 embodies the step of further judging the opposite state. Thus, according to the solutions described in these embodiments, it can be further determined whether the target device and the head-mounted display device are in the opposite state by judging the angle, avoiding misjudgment caused by determining whether the target device and the head-mounted display device are in the opposite state only based on the attitude angle deviations between the three-axis attitude angles of the target device and the three-axis attitude angles of the head-mounted display device. Therefore, the misjudgment rate is reduced, and the user experience is further improved.

Figure 6:
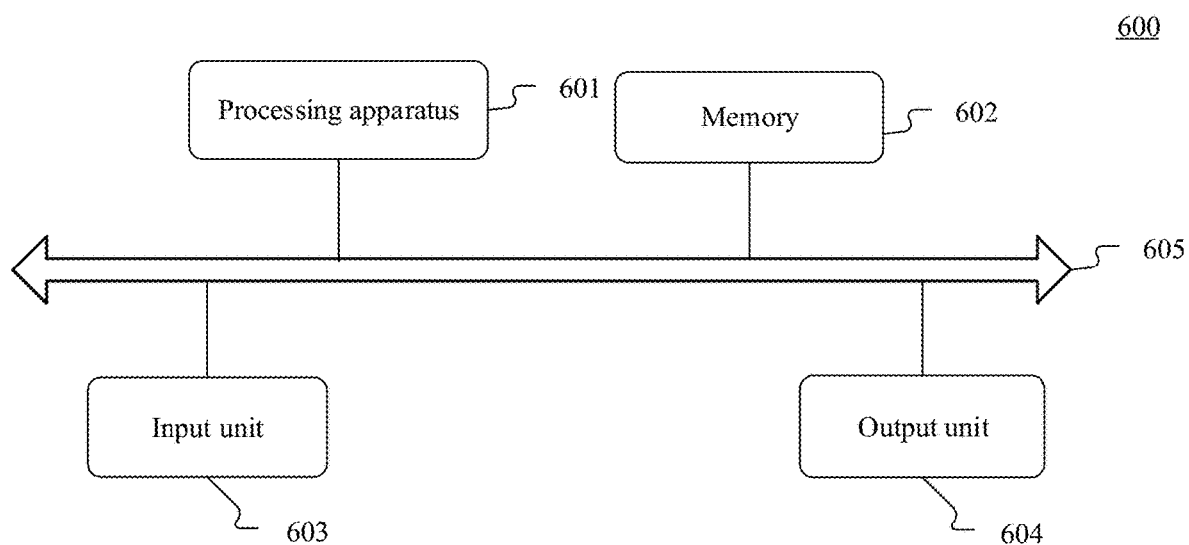
FIG. 6 is a schematic structural diagram of an electronic device suitable for implementing some embodiments of the present disclosure.

Further referring to FIG. 6, a schematic structural diagram of a head-mounted display device 600 suitable for implementing some embodiments of the present disclosure is shown. The head-mounted display device shown in FIG. 6 is merely one example and should not impose any limitation on the functions and scope of use of the embodiments of the present disclosure.

As shown in FIG. 6, the head-mounted display device 600 may include a processing apparatus (e.g., a central processing unit, a graphics processing unit, etc.) 601, a memory 602, an input unit 603, an output unit 604, where, the processing apparatus 601, the memory 602, the input unit 603 and the output unit 604 are connected to each other via a bus 605. The processing apparatus 601 in the head-mounted display device specifically implements a presentation content update function defined in the method of the present disclosure by invoking a computer program stored in the memory 602. In some implementations, the input unit 603 may include a sensor signal receiving device. Thus, first sensor data with respect to a target device sent by a first sensor may be received by the sensor signal receiving device in the input unit 603. The output unit 604 may include a display screen used to display presentation content.

Although FIG. 6 illustrates the electronic device 600 having various apparatuses, it should be understood that not all illustrated apparatuses are required to be implemented or provided. More or fewer apparatuses may alternatively be implemented or provided. Each block shown in FIG. 6 may represent one apparatus or may represent a plurality of apparatuses as desired.

In particular, according to some embodiments of the present disclosure, the process described above with reference to the flowchart may be implemented as a computer software program and stored in the memory 602. For example, some embodiments of the present disclosure include a computer program product including a computer program carried on a computer-readable medium, the computer program containing a program code for performing the method shown in the flowchart. When the computer program is executed by the processing apparatus 601, the functions defined in the method of some embodiments of the present disclosure are performed.

It should be noted that the computer-readable medium recited in some embodiments of the present disclosure may be a computer-readable signal medium or a computer-readable storage medium or any combination of the two. The computer-readable storage medium may be, for example, but not limited to, an electronic, magnetic, optical, electromagnetic, infrared, or semiconductor system, apparatus, or device, or any combination thereof. More specific examples of the computer-readable storage medium may include, but is not limited to: an electrical connection having one or more wires, a portable computer disk, a hard disk, a random access memory (RAM), a read-only memory (ROM), an erasable programmable read-only memory (EPROM or flash memory), an optical fiber, a portable compact disc read-only memory (CD-ROM), an optical storage device, a magnetic storage device, or any suitable combination thereof. In some embodiments of the present disclosure, the computer-readable storage medium may be any tangible medium that contains, or stores a program that can be used by or in conjunction with an instruction execution system, apparatus, or device. In some embodiments of the present disclosure, the computer-readable signal medium may include a data signal, carrying computer-readable program code therein, propagated in baseband or as part of a carrier wave. Such propagated data signal may take many forms, including, but not limited to, an electromagnetic signal, an optical signal, or any suitable combination thereof. The computer-readable signal medium may also be any computer-readable medium other than the computer-readable storage medium that can transmit, propagate, or transport a program that can be used by or in connection with an instruction execution system, apparatus, or device. The program code contained on the computer-readable medium may be transmitted using any appropriate medium, including but not limited to a wire, an optical cable, radio frequency (RF), etc., or any suitable combination thereof.

In some implementations, a client and a server may use any currently known or future developed network protocol, such as a hypertext transfer protocol (HTTP) to communicate, and may be interconnected with any form or medium of digital data (e.g., a communication network). Examples of the communication network include a local area network (LAN), a wide area network (WAN), an inter-network (e.g., the Internet), and a peer-to-peer network (e.g., an ad hoc peer-to-peer network), as well as any currently known or future developed network.

The computer-readable medium may be included in the electronic device, or may exist alone without being assembled into the electronic device. The computer-readable medium carries one or more programs that, when executed by the electronic device, cause the electronic display device to: determine three-axis attitude angles of a target device and three-axis attitude angles of the head-mounted display device based on first sensor data with respect to the target device sent by a first sensor and second sensor data with respect to the head-mounted display device sent by a second sensor; determine whether the three-axis attitude angles of the target device and the three-axis attitude angles of the head-mounted display device meet an attitude angle deviation detection condition; and update presentation content on a display screen of the head-mounted display device in response to determining that the three-axis attitude angles of the target device and the three-axis attitude angles of the head-mounted display device meet the attitude angle deviation detection condition.

The computer program code for performing operations of some embodiments of the present disclosure may be written in one or more programming languages or combinations thereof, including an object oriented programming language such as Java, Smalltalk, C++ and conventional procedural programming languages, such as the "C" programming language or similar programming languages. The program code may be executed entirely on a user computer, partly on a user computer, as a stand-alone software package, partly on a user computer and partly on a remote computer, or entirely on a remote computer or server. In the case involving the remote computer, the remote computer may be connected to the user computer through any type of network, including a local area network (LAN) or a wide area network (WAN), or connected to an external computer (for example, via the Internet using an Internet service provider).

The flowcharts and block diagrams in the figures illustrate the architecture, functionality, and operation of possible implementations of systems, methods, and computer program products according to various embodiments of the present disclosure. In this regard, each block in the flowcharts or block diagrams may represent a module, program segment, or portion of a code, which includes one or more executable instructions for implementing a specified logical function. It should also be noted that, in some alternative implementations, the functions noted in the blocks may also occur out of the order noted in the figures. For example, two blocks shown in succession may, in fact, be executed substantially concurrently, or may sometimes be executed in the reverse order, depending upon the functions involved. It should also be noted that each block of the block diagrams and/or flowcharts, and combinations of blocks in the block diagrams and/or flowcharts, may be implemented by special purpose hardware-based systems that perform a specified functions or operation or combinations of special purpose hardware and computer instructions.

The functions described above herein may be performed, at least in part, by one or more hardware logic components. For example, without limitation, exemplary types of hardware logic components that can be used include field-programmable gate arrays (FPGA), application-specific integrated circuits (ASIC), application-specific standard products (ASSP), system-on-chip systems (SOC), complex programmable logic devices (CPLD), and the like.

What is claimed:

1. A presentation content update method, applied to a head-mounted display device having a display screen, comprising:

determining three-axis attitude angles of a target device and three-axis attitude angles of the head-mounted display device based on first sensor data with respect to the target device sent by a first sensor and second sensor data with respect to the head-mounted display device sent by a second sensor;

determining whether the three-axis attitude angles of the target device and the three-axis attitude angles of the head-mounted display device meet an attitude angle deviation detection condition; and updating presentation content on the display screen of the head-mounted display device in response to determining that the three-axis attitude angles of the target device and the three-axis attitude angles of the head-mounted display device meet the attitude angle deviation detection condition.

2. The method according to claim 1, wherein after the determining whether the three-axis attitude angles of the target device and the three-axis attitude angles of the head-mounted display device meet an attitude angle deviation detection condition, the method further comprising:

determining whether the target device and the head-mounted display device are in an opposite state in response to determining that the three-axis attitude angles of the target device and the three-axis attitude angles of the head-mounted display device meet the attitude angle deviation detection condition.

3. The method according to claim 2, wherein the determining whether the target device and the head-mounted display device are in an opposite state comprises:

controlling a front camera in the target device to shoot an image, to obtain a first target image;

determining whether the first target image comprises a target image area, wherein the target image area comprises an image of a face wearing the head-mounted display device; and in response to determining that the first target image comprises the target image area, determining an angle between a center point of the target image area and a location of the front camera in the target device when the first target image is shot.

4. The method according to claim 3, wherein the determining whether the target device and the head-mounted display device are in an opposite state further comprises:

in response to determining that the angle is within a preset angle range, determining that the target device and the head-mounted display device are in the opposite state.

5. The method according to claim 4, wherein the updating presentation content on the display screen of the head-mounted display device in response to determining that the three-axis attitude angles of the target device and the three-axis attitude angles of the head-mounted display device meet the attitude angle deviation detection condition comprises:

updating the presentation content on the display screen of the head-mounted display device in response to determining that the three-axis attitude angles of the target device and the three-axis attitude angles of the head-mounted display device meet the attitude angle deviation detection condition, and the target device and the head-mounted display device are in the opposite state.

6. The method according to claim 5, wherein after the updating presentation content on the display screen of the head-mounted display device in response to determining that the three-axis attitude angles of the target device and the three-axis attitude angles of the head-mounted display device meet the attitude angle deviation detection condition, the method further comprises:

in response to detecting that the opposite state between the target device and the head-mounted display device is eliminated, displaying the presentation content removed previously on the display screen of the head-mounted display device.

7. The method according to claim 2, whether the determining whether the target device and the head-mounted display device are in an opposite state comprises:

controlling the target device to display at least one graphic mark in a page currently displayed by the target device;

controlling a front camera in the head-mounted display device to shoot an image, to obtain a second target image; and in response to determining that the second target image comprises the at least one graphic mark, determining an angle between the target device and a location of the front camera in the head-mounted display device when the second target image is shot according to the at least one graphic mark comprised in the second target image.

8. The method according to claim 7, wherein before the controlling the target device to display at least one graphic mark in a page currently displayed by the target device, the method further comprises:

in response to determining that the target device is in a screen off state, controlling the target device to turn on the screen.

9. The method according to claim 1, wherein the first sensor data and the second sensor data comprise three-axis angular acceleration data; and the determining three-axis attitude angles of a target device and three-axis attitude angles of the head-mounted display device based on first sensor data with respect to the target device sent by a first sensor and second sensor data with respect to the head-mounted display device sent by a second sensor comprises:

filtering and integrating the three-axis angular acceleration data comprised in the received first sensor data to obtain the three-axis attitude angles of the target device, and filtering and integrating the three-axis angular acceleration data comprised in the received second sensor data to obtain the three-axis attitude angles of the head-mounted display device.

10. The method according to claim 1, wherein the updating presentation content on the display screen of the head-mounted display device comprises:

removing the presentation content on the display screen of the head-mounted display device.

* * * * *